United States Patent
Meher-Homji (12)

(10) Patent No.: US 6,228,225 B1
(45) Date of Patent: May 8, 2001

(54) COKE DRUM SEMI AUTOMATIC TOP DEHEADER

(75) Inventor: Feroze J. Meher-Homji, Sugar Land, TX (US)

(73) Assignee: Bechtel Corporation, Houston, TX (US)

( * ) Notice: Subject to any disclaimer, the term of this patent is extended or adjusted under 35 U.S.C. 154(b) by 0 days.

(21) Appl. No.: 09/387,030

(22) Filed: Aug. 31, 1999

Related U.S. Application Data (60) Provisional application No. 60/098,507, filed on Aug. 31, 1998.

(51) Int. Cl.[7] ............................ C10B 25/00; C10B 25/10; C10B 25/14; C10B 25/22
(52) U.S. Cl. .................... 202/250; 202/242; 202/244; 202/245; 49/129; 49/329
(58) Field of Search ........................ 202/242, 244, 202/245, 250, 270, 241; 201/2, 41; 220/329, 331, 334; 49/128, 130, 197, 504, 129

(56) References Cited

U.S. PATENT DOCUMENTS 4,085,008 * 4/1978 Kinzler .................... 202/151
4,299,332   11/1981 Pechacek ................. 220/378
5,221,019   6/1993 Pachacek et al. ......... 220/315
5,259,930   11/1993 Barker et al. ............ 201/2
5,417,811   5/1995 Malsbury ................. 202/241
5,785,843   7/1998 Antalffy et al. .......... 208/131

* cited by examiner

*Primary Examiner*—Shrive Beck
*Assistant Examiner*—Alexa A. Doroshevk
(74) *Attorney, Agent, or Firm*—William P. Jensen; Shook, Hardy & Bacon L.L.P.

(57) ABSTRACT

A semi automatic coke drum deheader device for use on a coke drum wherein the coke drum includes an upper opening, a flange surrounding the upper opening and a first vessel cover releasably attached to the flange. The deheader device comprises a frame attached to the coke drum, a bridge for supporting the first vessel cover and a second vessel cover, a central shaft having a distal end connected to the bridge and a thrust collar surrounding the shaft below the distal end. A lift assembly is attached to the frame for engaging the thrust collar to selectively raise and lower the bridge relative to the flange, and a rotational assembly is operatively connected to the central shaft for rotating the bridge to selectively align the first vessel cover or the second vessel cover above the flange during the delayed coking process.

18 Claims, 8 Drawing Sheets

COKE DRUM SEMI AUTOMATIC TOP DEHEADER

This application claims the benefit of provisional application number 60/098,507 filed Aug. 31, 1998.

BACKGROUND OF THE INVENTION

Delayed coking is a seventy year old refining technology which converts heavy fuel constituents, sometimes referred to as "resid", into lighter products such as gasoline and diesel stock. In the 70's and 80's external factors converged to accelerate the global trend of a diminishing heavy fuel oil market in favor of lighter gasoline and diesel products. Delayed coking now represents approximately twenty percent of the world's resid upgrading capacity and nearly fifty percent of the U.S. capacity. Most petroleum coke is sold as solid fuel and has a relatively low market value, at least in comparison to oil prices.

The delayed coking process takes approximately eighteen hours to produce coke from the resid or hydrocarbon feedstock. The process is carried out in large coke drums, typically twenty seven to twenty nine feet in diameter and approximately one hundred and thirty feet in height. Temperatures in the coke drum range from approximately nine hundred Fahrenheit to nine hundred and fifty degrees Fahrenheit. A coker site typically consists of two or four vertically mounted coke drums, pumps, decoking valves, control rooms, hoisting equipment and material handling equipment.

The hydrocarbon feedstock is fed from a pipe through the bottom flange of the coke drum. A blind flange is bolted onto the coke drum's upper flange during the delayed coking process. Coke formed inside the coke drum is then removed by drilling with high pressure water fed through jets in a drill head attached to a drill stem which is moved axially inside the coke drum using a derrick and a winch.

Once the coking process is complete and the coke drum has been quenched and cooled, the blind flange, weighing approximately 1000–1200 pounds, must be manually removed (unbolted) using an impact wrench. The blind flange is then hoisted away from the coke drum. A clamshell assembly is then manually positioned over the coke drum and bolted to the upper flange where the blind flange was removed. The clam shell assembly is manually opened for insertion of the drill stem and pilot drill head. Once the drill stem is positioned to cut the coke in the coke drum, the clam shell assembly is closed around the drill stem and locked to prevent escaping vapor and particles during the initial phase of the coke cutting process. Once a pilot hole is drilled axially through the coke in the coke drum, the clamshell assembly is unlocked and the pilot drill head and drill stem are removed. The drill stem is then fitted with the final cutting drill head and inserted in the coke drum for completion of the coke cutting process. During the final cutting process, coke is removed from the coke drum through a bottom flange in the coke drum. The clam shell assembly must be manually opened and closed during the final coke cutting process as described for the initial coke cutting process. Once the final coke cutting process is complete, the clam shell assembly is manually removed from the coke drum and replaced with the blind flange which is bolted onto the upper flange of the coke drum.

The manual removal and replacement of the blind flange with the clamshell assembly during the delayed coking process has traditionally been time consuming and hazardous to operations personnel because of the size and weight of the blind flange and because of the hazardous vapors and pressurized steam that escape from the upper flange of the coke drum during removal of the blind flange.

The deheading operation during the delayed coking process has been replaced in some instances by fully automated devices such as U.S. Pat. No. 5,221,019 to Pechacek, et al. and U.S. Pat. No. 5,785,843 to Antalffy, et al. which address the removal of the bottom head or cover of a coke drum. Although fully automated, such devices are typically more expensive to manufacture and operate, making them cost prohibitive under certain conditions. Additionally, fully automated coke drum deheader devices must comply with American Society of Mechanical Engineering (A.S.M.E.) pressure vessel standards as a result of having to seal the coke drum, during the coking process.

Consequently, there is a need for a device capable of removing the top head of a coke drum that overcomes the foregoing disadvantages of the manual process while avoiding expensive manufacturing and operating costs and having to comply with A.S.M.E. standards.

SUMMARY OF THE INVENTION

The present invention discloses a semi automatic top deheader device that overcomes the foregoing disadvantages associated with the manual process of removing the top or blind flange of a coke drum and replacing it with a clamshell assembly, and is cost effective as compared with a fully automated system. The deheader device generally comprises a frame, a rotatable bridge, a lift assembly, a rotational assembly and a plurality of actuators for operating each assembly. The deheader device lifts and rotates the blind flange away from the coke drum in order that the clam shell assembly may be attached to the coke drum prior to the coke cutting process. The blind flange and clamshell assembly are attached on opposite ends of the rotating bridge which can be rotated about a vertical axis of the deheader device through any angle up to 180 degrees.

The lift assembly includes a thrust collar and a pair of rotatable bearings attached to a lift frame coke which supports the bridge and the other rotating components of the deheader device. A lift actuator, remotely controlled by an operator, provides the force needed to lift the blind flange up and away from the upper flange of the coke drum. A rotatory actuator, remotely controlled by the operator, provides the force needed to rotate the blind flange and clamshell assembly 180 degrees.

The clam shell assembly includes a lock ring and a first and second shell section each secured or locked during the coke cutting process by a respective actuator which is remotely controlled. A remote console is provided for the operator to operate the deheader device substantially away from the coke drum. Although removal and attachment of the blind flange is manually performed using a pneumatic impact wrench, operation of the deheader device during the remainder of the delayed coking process is remotely controlled by the operator using the deheader device of the present invention.

It is therefore a primary object of the present invention to provide a cost effective semi automatic top deheader device that substantially reduces the time needed to complete the exchange between the blind flange and the clam shell assembly while significantly improving operator and equipment safety.

It is another object of the present invention to provide a semi automatic top deheader device, which is capable of remote operation during the delayed coking process.

It is still another object of the present invention to provide a semi automatic top deheader device that permits direct manual operation of the deheader device in the event of a malfunction without undue delay of the delayed coking process.

It is yet another object of the present invention to provide a semi automatic top deheader device with a remotely operated clam ring and clam shell assembly during the coke cutting process.

It is yet another object of the present invention to provide a semi automatic top deheader device that eliminates the need to weight the blind flange in order to positively impose a force against the upper flange of the coke drum while the blind flange is unbolted from the coke drum due to residual pressure in the coke drum.

It is yet another object of the present invention to provide a semi automatic top deheader device that is rugged, easily maintained and does not require compliance with A.S.M.E. pressure vessel code standards.

It is yet another object of the present invention to provide the semi automatic top deheader device with positive locking of the blind flange on the upper flange of the coke drum during unbolting of the blind flange, in order to prevent residual pressure in the coke drum from lifting the blind flange off the upperflange.

It is a feature of the present invention to provide the semi automatic top deheader device with safety control interlocks comprising proximity switches for interlocking and position indication of the mechanisms on the deheader device.

It is another feature of the present invention to provide the semi automatic top deheader device with a locking assembly for selectively securing the clam shell assembly or blind flange to the flange on the coke drum.

DETAILED DESCRIPTION OF PREFERRED EMBODIMENTS

Figure 1:
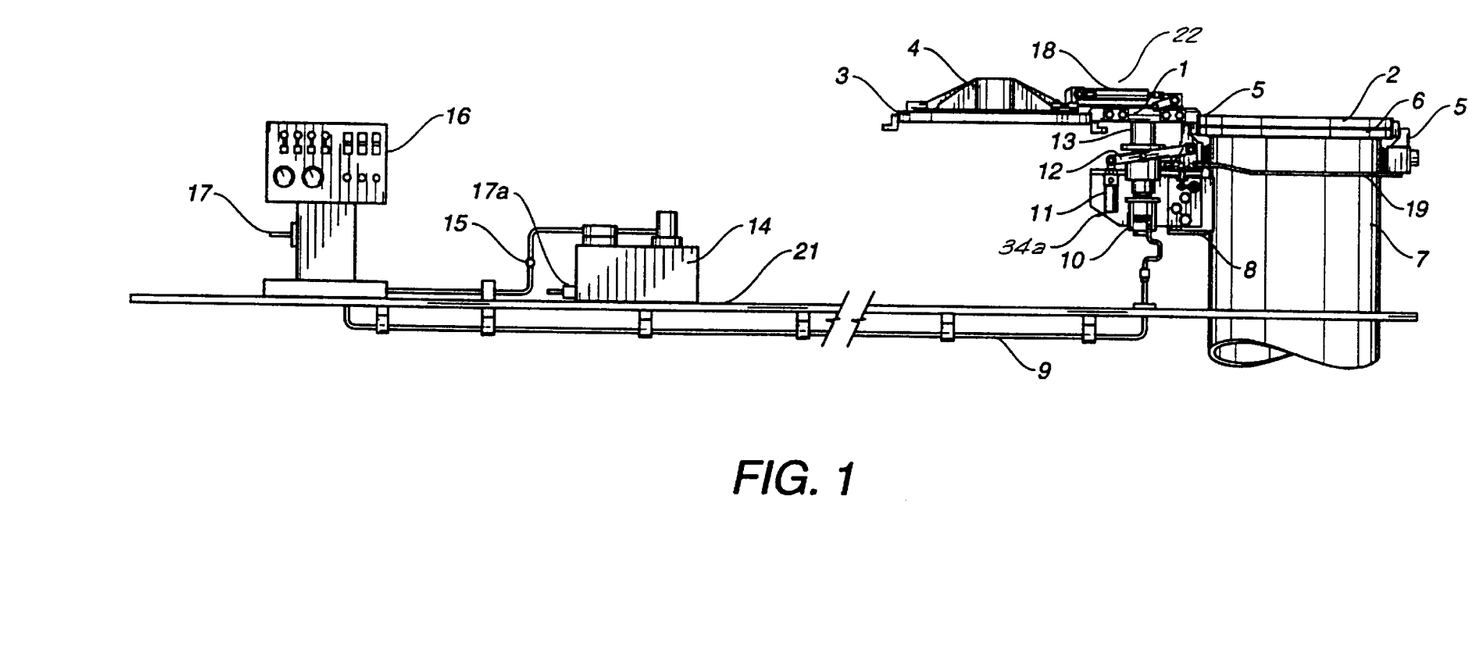
FIG. 1 is an elevation view of the semi automatic top deheader device of the present invention illustrating the exchange assembly attached to a coke drum nozzle, a power unit and control console.
Figure 1A:
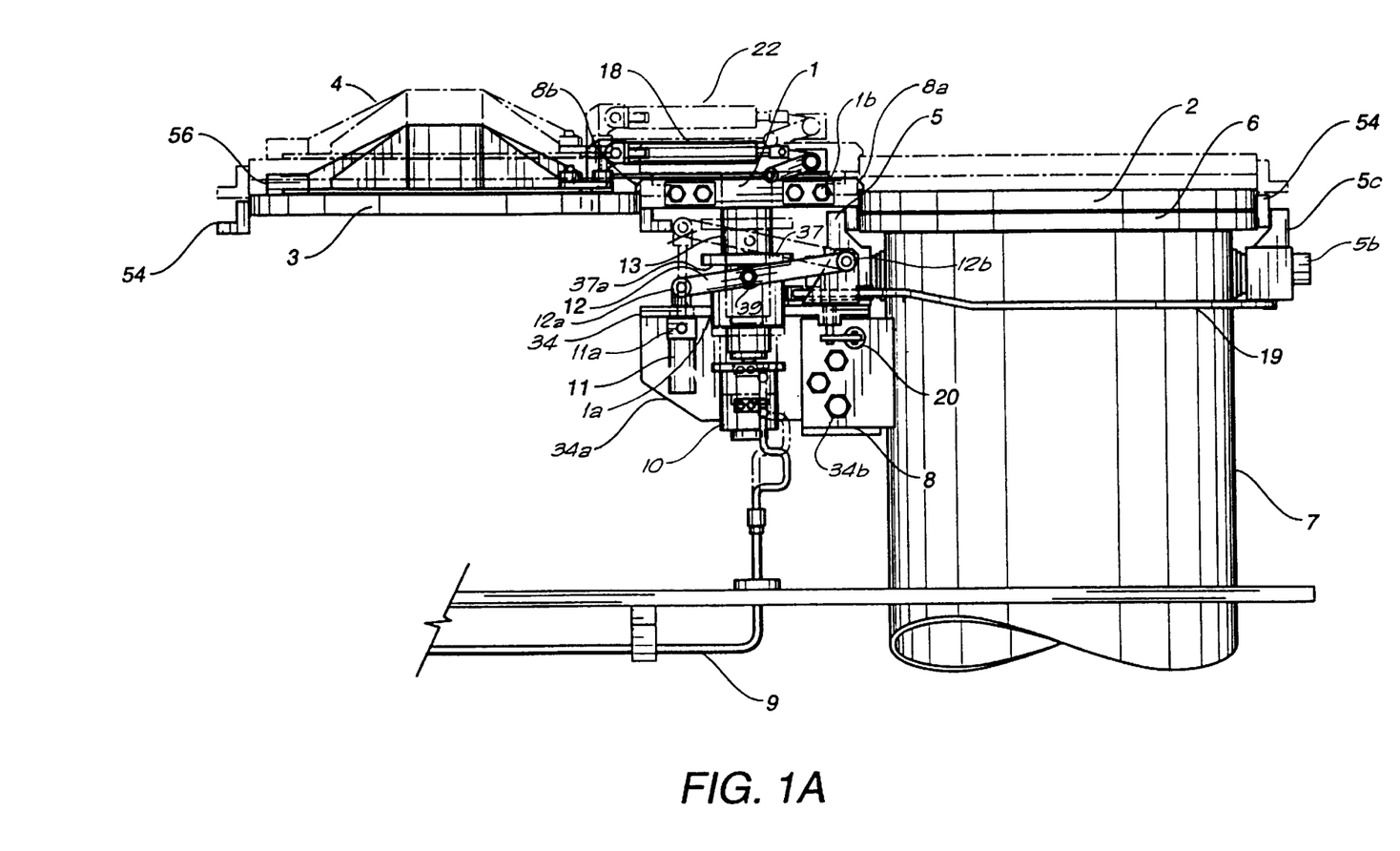
FIG. 1A is a partial elevation view of the embodiment shown in FIG. 1 illustrating axial movement of a portion of the exchange assembly.

Referring to FIGS. 1 and 1A, an elevation view of the semi automatic top deheader device 22 is shown attached to the nozzle 7 of a coke drum vessel. The nozzle 7 includes a blind flange 2, hereinafter referred to as the first vessel cover, and an upper opening below the first vessel cover 2 surrounded by a flange 6. The first vessel cover 2 is releasably attached to the flange 6 by a plurality of bolts 2a shown in FIG. 2.

Figure 3:
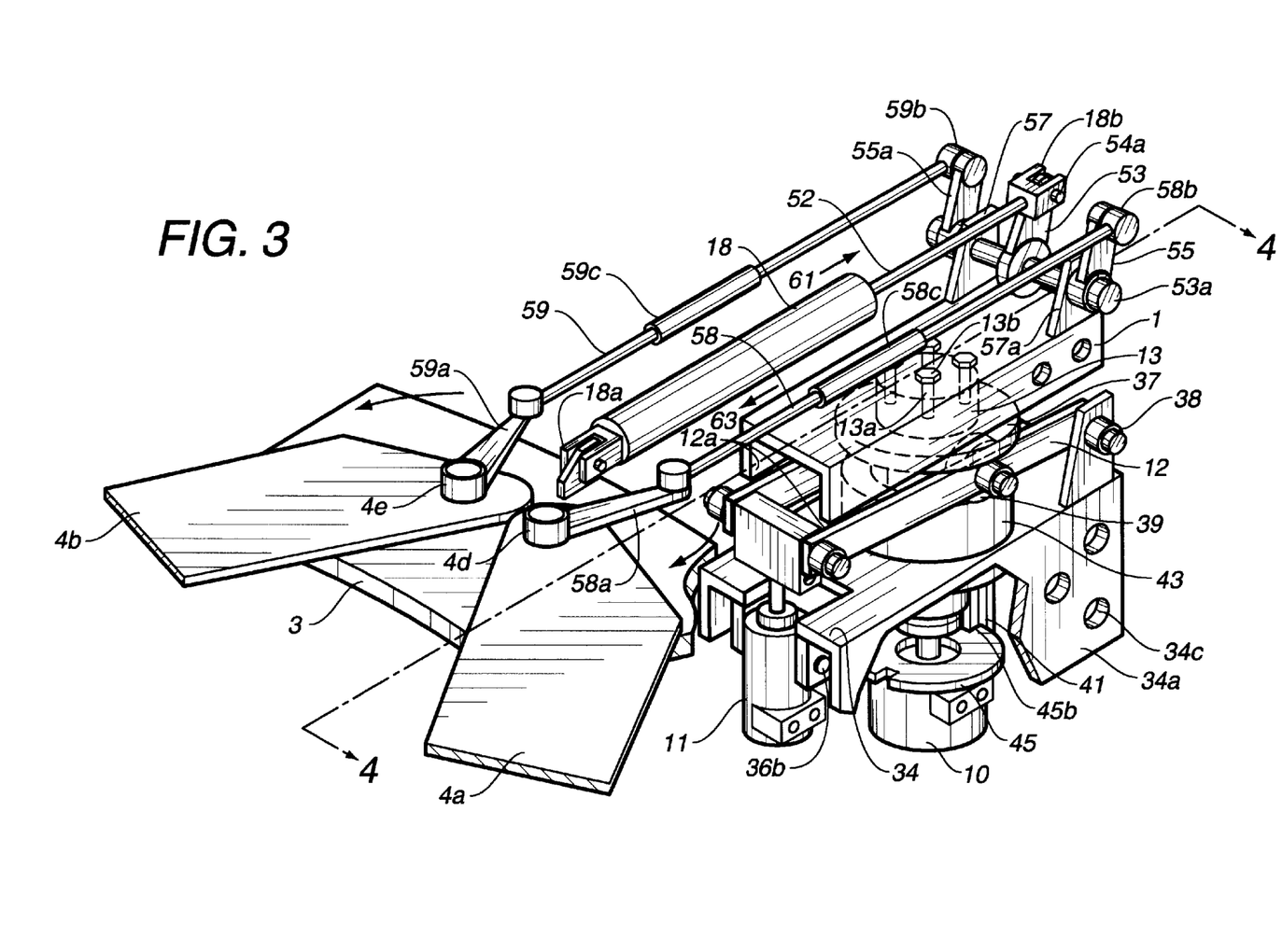
FIG. 3 is an isometric view of a portion of the exchange assembly shown in FIG. 1A illustrating a cutaway portion of the retractable shell.

The deheader device 22 is attached to the nozzle 7 by a bracket 8 which is welded to the nozzle 7 adjacent the upper opening to ensure stability of the deheader device 22 during its operation. The bracket 8 is bolted to a frame 34a of the deheader device 22 by a plurality of bolts 34b that are positioned through a plurality of respective apertures (not shown) in the bracket 8 and a plurality of respective apertures 34c in the frame 34a, as shown in FIG. 3. Referring back to FIG. 1A, the bracket 8 supports the combined weight of the deheader device 22, the first vessel cover 2, a lock ring 3 and a clamshell assembly 4, hereinafter referred to as the second vessel cover, which weighs approximately 2,500 lbs.

The frame 34a includes a base 34 having an opening 1a there through. A central shaft 13 is positioned through the opening 1a and includes a distal end 13a connected to a bridge 1 by a plurality of bolts 13b as shown in FIG. 3. The bridge 1 is provided for supporting the first vessel cover 2 and the second vessel cover 4. A thrust collar 37 having a thrust surface 37a surrounds the central shaft 13 below the distal end 13a of the central shaft 13.

A lift assembly is positioned below the thrust collar 37 for engaging the thrust surface 37a and selectively raising and lowering the bridge 1 relative to the flange 6. The lift assembly includes a lift actuator 11 pivotally secured to the base 34, and a lift frame 12 partially surrounding the central shaft 13. The lift frame 12 includes a first closed end 12a pivotally connected to the lift actuator 10, and a second open end 12b pivotally connected to the base 34. A pair of rotatable bearings 39 are positioned intermediate the first and second ends 12a and 12b of the lift frame 12. Angular movement of the lift frame 12 causes the rotatable bearings 39 to engage the thrust surface 37a, resulting in axial movement of the bridge 1 as the rotatable bearings 39 traverse at least a portion of the thrust surface 37a which is illustrated by the phantom axial movement of the lift assembly in FIG. 1A. A rotational assembly is operatively connected to the central shaft 13 for rotating the bridge 1 to selectively align the first vessel cover 2 or the second vessel cover 4 above the flange 6 as described more particularly in reference to FIGS. 3 and 4.

The first vessel cover 2 is releasably secured to the bridge 1 by a first vessel cover bracket 8a, and the second vessel cover 4 is releasably secured to the bridge 1 by a second vessel cover bracket 8b. The first and second vessel cover bracket 8a and 8b are each welded at one end to a respective first and second vessel cover 2 and 4. The first and second vessel cover brackets 8a and 8b are each bolted at another end to opposite ends of the bridge 1 by a plurality of bolts 1b, as shown in FIG. 1A. Thus, the first and second vessel covers 2 and 4 are positioned opposite one another relative to the bridge 1 in order to facilitate balance when the bridge I is rotated. The second vessel cover includes a locking ring 3 and a retractable shell comprising a first shell section 4a and a second shell section 4b as described more particularly in reference to FIG. 2.

Figure 4:
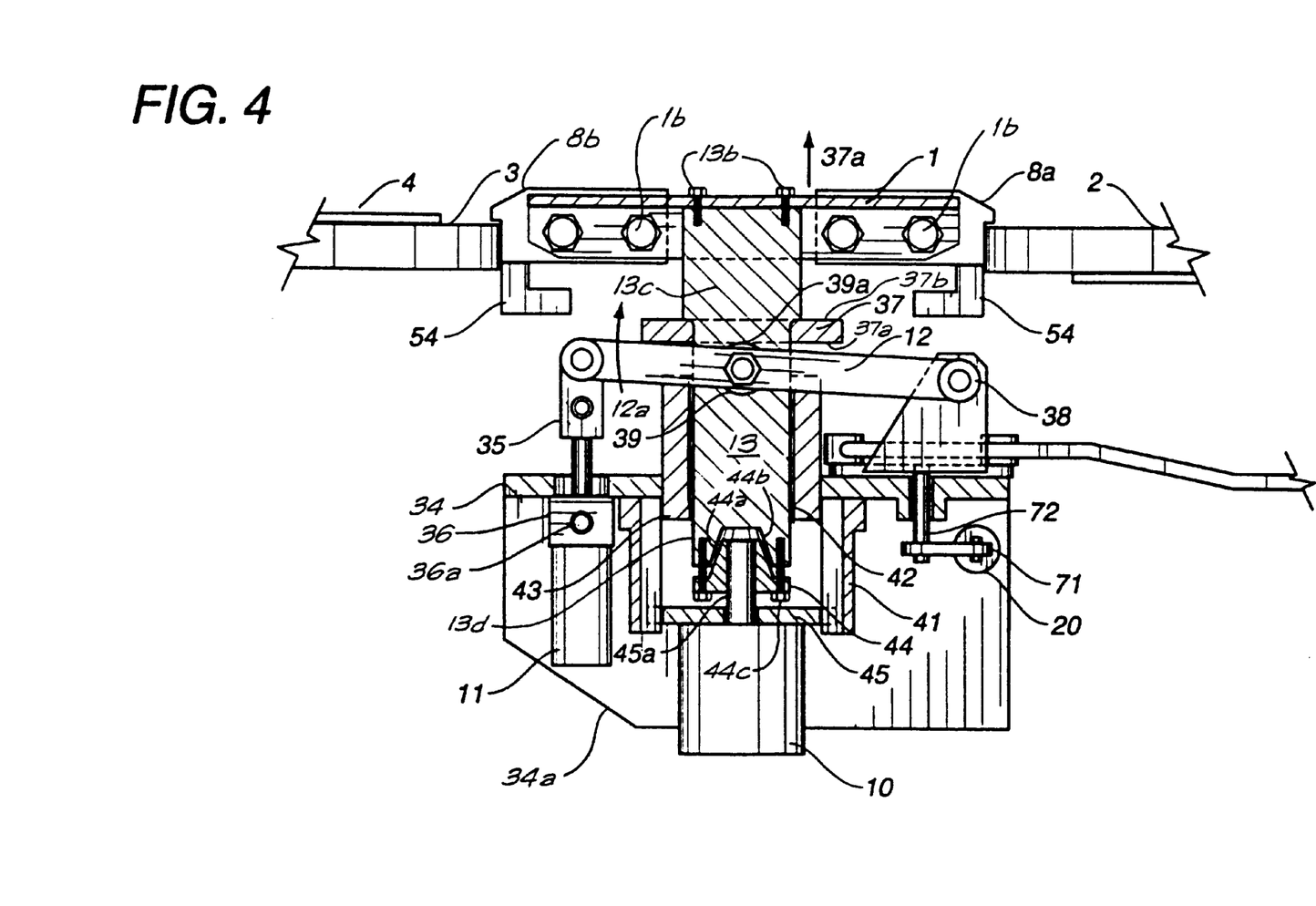
FIG. 4 is a partial cross-section elevation view taken along line 4—4 in FIG. 3.

With reference now to FIGS. 3 and 4, the lift actuator 11 is pivotally connected to the base 34 by a pair of actuator brackets 36 positioned on opposite sides of the lift actuator 11 as partially shown in FIG. 4. The actuator brackets 36 each have an opening 36a for receipt of a pin 36b pivotally attached to the lift actuator 11 so that the lift actuator 11 may pivot relative to movement of the lift frame 12 in direction 12a. The lift actuator 11 is pivotally attached to lift frame 12 by a piston rod connection 35. In one embodiment, the plurality of rotatable bearings 39 include a pair of wheels positioned on the lift frame 12 opposite one another relative to the central shaft 13. Upon activation of the lift assembly, the rotatable bearings 39 engage the thrust surface 37a at 39a thus, translating angular movement of the lift frame 12 into axial movement of the thrust collar 37 and bridge 1 in direction 37a, and enabling the first vessel cover 2 and second vessel cover 4 to be selectively raised and lowered.

In order to provide support for the central shaft 13 relative to the frame 34a, a tubular support housing 43 is attached to the base 34 through opening 1a. The central shaft 13 is moveably supported within the support housing 43, which is welded to the base 34 within the opening 1a. A bearing 42 is disposed within the support housing 43 and enables axial and rotational movement of the central shaft 13 within the support housing 43. The central shaft 13 may also be stepped to provide additional stabilization of the bridge 1. In FIG. 4 for example, the first shaft section 13c has an outside diameter above a supporting surface of the thrust collar 37b that is larger than an outside diameter of the second shaft section 13d.

The rotational assembly includes a rotary actuator 10 operatively connected to the base 34 and a coupling 44, as shown in FIGS. 3 and 4. The rotary actuator 10 is operatively secured to the base 34 by a pair of brace members 41 attached to the base 34, and a securing plate 45 attached to the rotary actuator 10. The securing plate 45 includes a pair of grooves 45b, as shown in FIG. 3 for receipt of the respective pair of brace members 41. The rotary actuator 10 is thus, secured from rotation relative to the brace members 41 and capable of axial movement with the central shaft 13 as shown more particularly by the illustrated phantom movement in FIG. 1A. The rotary actuator is operatively connected to the coupling 44 by a rotary actuator shaft 45a. The coupling 44 connects the rotary actuator 10 and the central shaft 13 for transmitting rotary movement between the rotary actuator 10 and the second shaft section 13d. The coupling 44 connects the actuator shaft 45a to the second shaft section 13d by means of a friction fit between surfaces 44a and 44b when the coupling 44 is secured to the second shaft section 13d by bolts 44c.

The central shaft 13 and bridge 1 are therefore, both controlled by the rotational assembly and lift assembly. The rotary actuator 10 is therefore, capable of rotating the first and second vessel covers 2 and 4 up to 180° after the lift actuator 11 has raised the first and second vessel covers 2 and 4 during the delayed coking process as more particularly described in reference to the operation of the deheader device below.

Figure 4A:
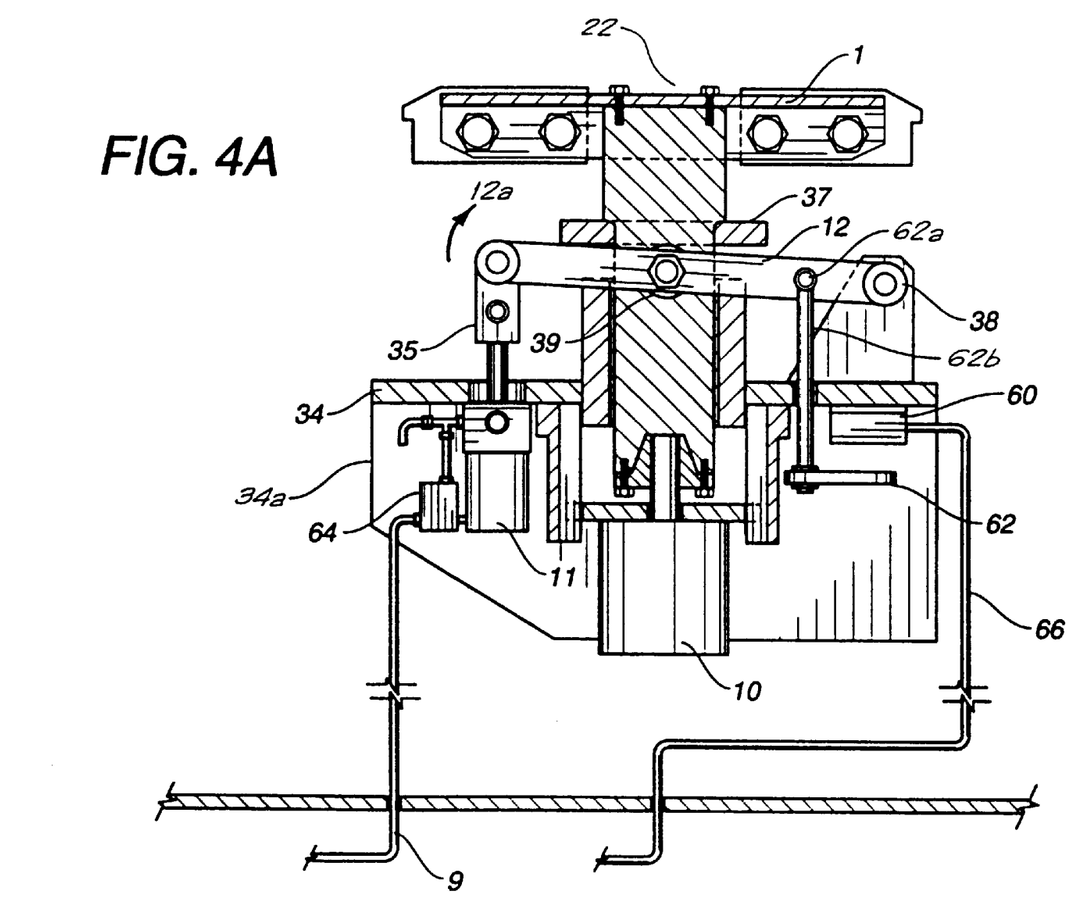
FIG. 4A is a partial cross-section elevation view of the exchange assembly shown in FIG. 4 illustrating a control interlock safety system and hydraulic supply system.

With reference now to FIG. 4A, a control interlock safety system comprising a proximity switch 60 and target plate 62 may be used to ensure that the first vessel cover 2 is safely lifted above the flange 6 before rotating the bridge 1. The target plate 62 is pivotally attached to the lift frame 12 at 62a by rod 62b. As the lift assembly moves in direction 12a, the target plate 62 approaches the proximity switch 60 sending a signal through circuitry 66 to the main control console 16 shown in FIG. 1. Once the target plate 62 is close to the proximity switch 60, the operator is then free to activate the rotational assembly. Similarly, a control interlock safety system utilizing a proximity switch and target plate similar to that described in reference to FIG. 4A for the lift actuator may be utilized with the rotary actuator to detect when rotation of the first vessel cover 2 and second vessel cover 4 are safely completed. In the event of an emergency, the process of rotation thus described, may be interrupted at any angle or movement up to 180°.

Figure 2:
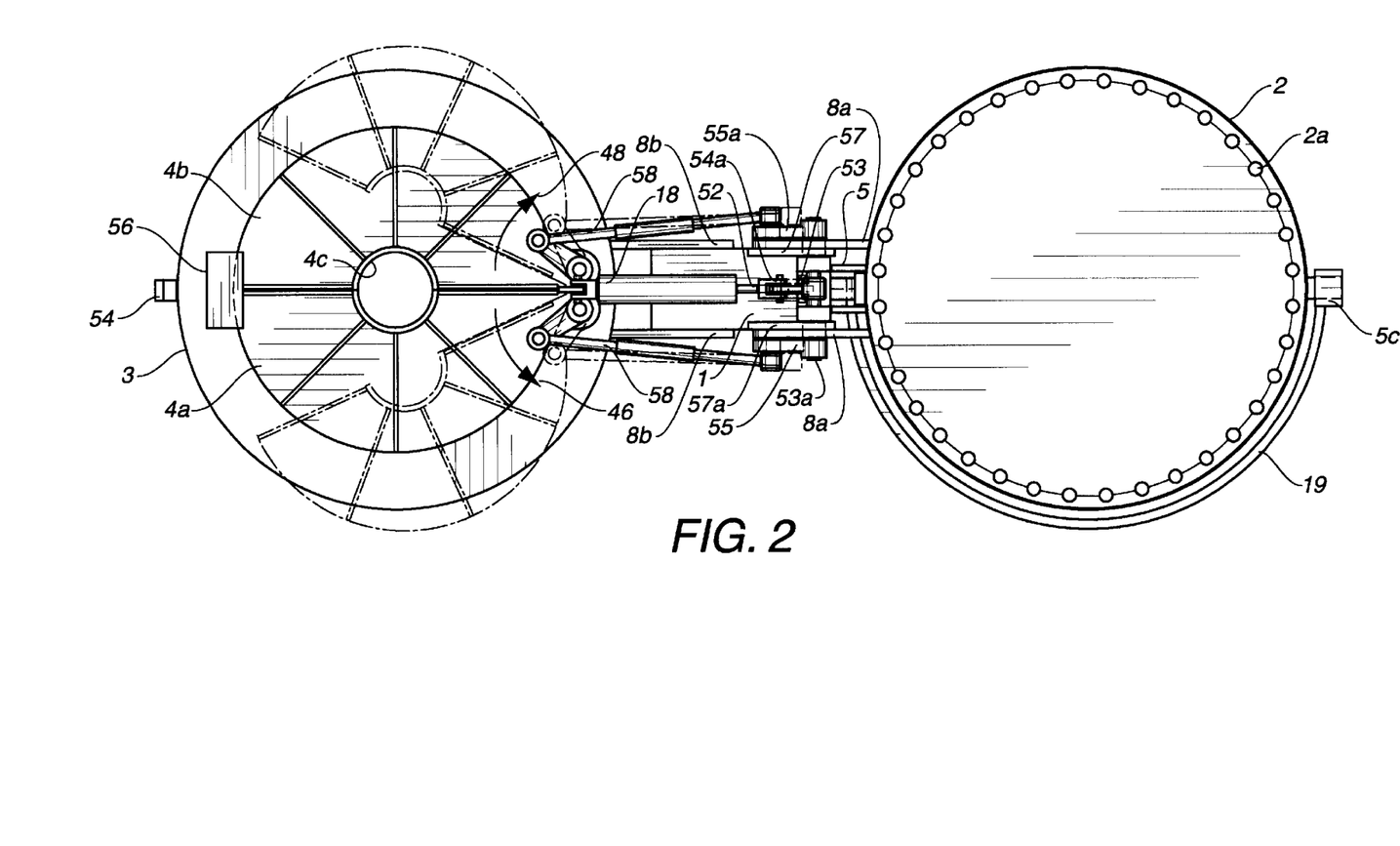
FIG. 2 is a plan view of the embodiment shown in FIG. 1A.

Referring now to FIGS. 2 and 3, the second vessel cover 4 includes a retractable shell comprising a first shell section 4a, a second shell section 4b and an opening 4c formed therethrough. The first and second shell sections 4a and 4b are each are pivotally attached to the locking ring 3 respectively at 4d and 4e. A retraction assembly is operatively connected to the first and second shell sections 4a and 4b for selectively moving the first and second shell sections 4a and 4b between an open and closed position as illustrated by the phantom movement of the first and second shell sections 4a and 4b in FIG. 2. Thus, the first shell section 4a will retract in direction 46 and the second shell section 4b will simultaneously retract in direction 48. The retraction assembly includes a retraction actuator 18 having a first end 18a connected to the locking ring 3 and a second end 18b pivotally connected to a first link 53. The retraction assembly further includes a first hinged arm 58 having a first end 58a connected to the first shell section 4a and a second end 58b pivotally connected to a second link 55 and a second hinged arm 59 having a first end 59a connected to the second shell section 4b and a second end 59b pivotally connected to a third link 55a. A transverse shaft 53a is secured to the bridge 1 by a pair of bridge flanges 57 to the bridge 1. The transverse shaft 53a freely rotates within respective openings in the bridge flanges 57. The first, second and third links 53, 55 and 55a are secured to the transverse shaft 53a. Thus, when the actuator 18 moves in direction 61, the transverse shaft 53a rotates in a clockwise direction causing the first hinged arm 58 and second hinged arm 59 to expand and open the first and second shell sections 4a and 4b. Conversely, when the retraction actuator moves in direction 63, the transverse shaft 53a rotates in a counter clockwise direction causing the first and second hinged arms 58 and 59 to retract and close the first and second shell sections 4a and 4b. First and second threaded tubulars 58a and 59c may be incorporated on the first and second hinged arms 58 and 59 to selectively adjust the length of the first and second hinged arms 58 and 59 as needed. As shown in FIG. 2, a retainer block 56 is attached to the locking ring 3 for securing the first and second shell sections 4a and 4b when in the closed position. Accordingly, the retraction actuator 18 is self-locking when the first and second shell sections 4a and 4b are in the closed position. Additionally, a loss of power to the retraction actuator 18 will not cause the first and second shell sections 4a and 4b to open.

Figure 4B:
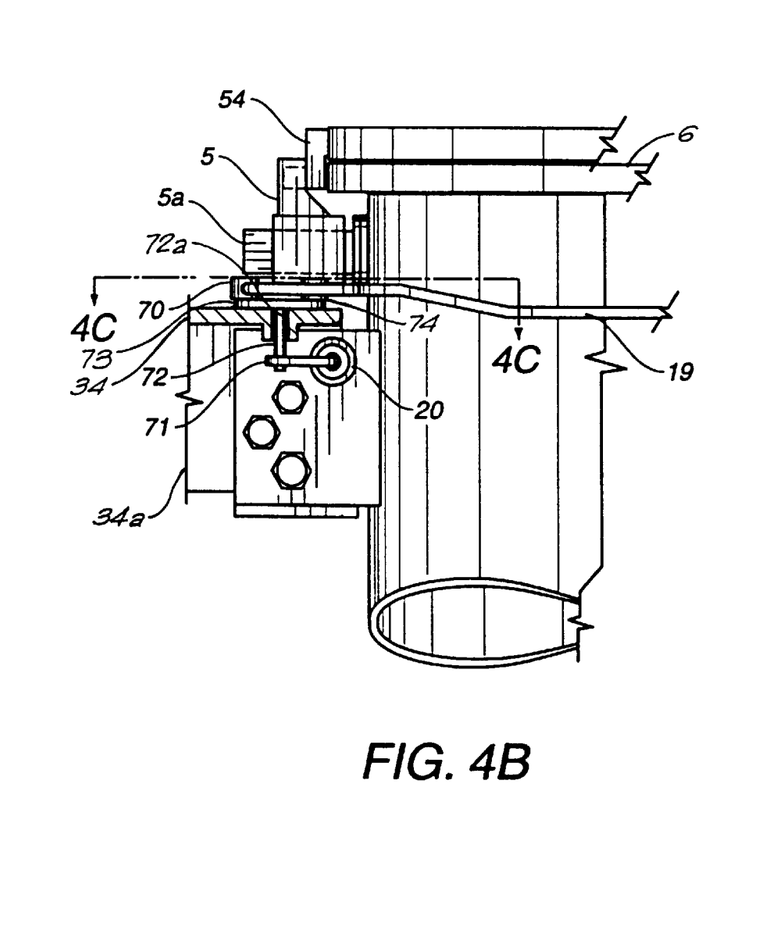
FIG. 4B is a partial elevation view illustrating the locking assembly.
Figure 4C:
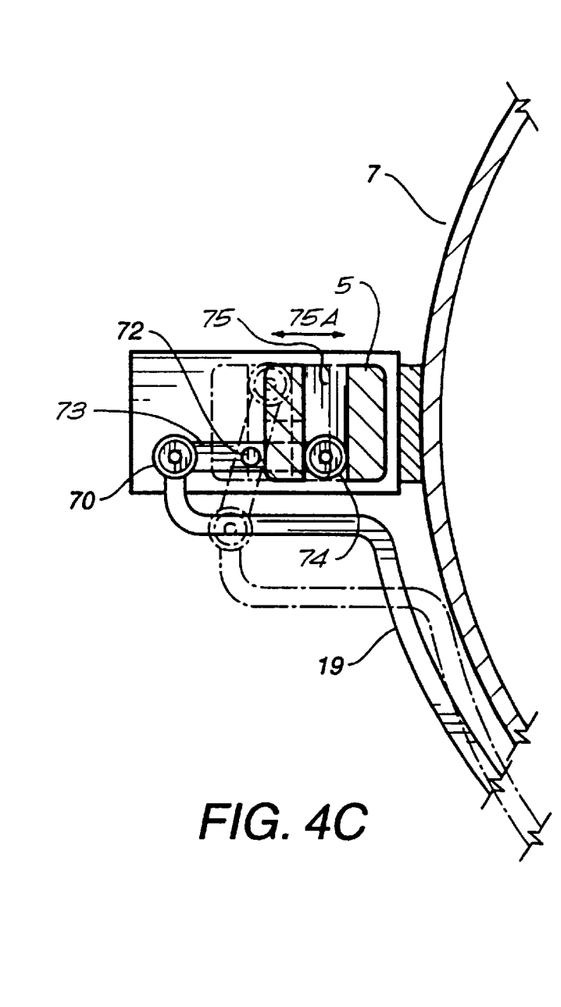
FIG. 4C is a plan view taken along line 4C—4C in FIG. 4B illustrating movement of a locking mechanism.

Referring now to FIGS. 1A, 4B and 4C, the locking assembly is shown for securing at least one of the first and second vessel covers 2 and 4 to the flange 6. The locking assembly includes a lock actuator 20 secured to the frame 34a. A rotatable pin 72 is positioned in pin opening 72a of the base 34, and is secured at one end to rod 73. A lever 71 is connected at one end to another end of the pin 72 and is pivotally connected at another end to the locking actuator 20. As the locking actuator 20 is activated, the lever 71 moves in a plane parallel to the base 34 causing the pin 72 to rotate rod 73 about an axis of the pin 72. The rod 73 includes a first end 74 positioned within a slotted opening 75 for operating a first lock mechanism 5 and a second end 70 pivotally connected to linkage 19 for operating a second lock mechanism 5c, as shown in FIG. 2. The first lock mechanism 5 is positioned opposite the second lock mechanism 5c relative to the nozzle 7 in order that at least one of the first and second vessel covers 2 and 4 may be optimally secured to the flange 6. The first and second lock mechanisms 5 and 5c each have an opening through a distal end above slotted opening 75 for receipt of a respective first and second lock support member 5a and 5b. Thus, when the locking actuator 20 is activated, rotational movement of the rod 73 is translated to radial movement of the first and second lock mechanisms 5 and 5c as indicated in direction 75a shown in FIG. 4C.

The first and second lock mechanisms 5 and 5c each include a recessed opening for receipt of a portion of a respective lug 54. A pair of lugs 54 are attached to each first and second vessel cover 2 and 4 in alignment with a respective first and second lock mechanism 5 and 5c when at least one of the first and second vessel covers 2 and 4 are aligned above the flange 6. As the rod 73 rotates in a counter clockwise direction, the first end of the rod 74 engages the slotted opening 75 in the distal end of the first lock mechanism 5 which disengages the first lock mechanism 5 from lug 54. Thus, actuation of the rod 73 in a counter clockwise direction positions the first lock mechanism 5 in an unlocked position as shown in the phantom illustration of FIG. 4C. Conversely, clockwise rotation of the rod 73 causes the first lock mechanism 5 to engage lug 54 which positions the first lock mechanism 5 in a locked position. The second lock mechanism 5c is similarly operated by the clockwise and counter clockwise rotation of rod 73 in conjunction with the linkage 19 pivotally connected to the second end 70 of rod 73. Accordingly, the first and second vessel covers 2 and 4 may be stabilized and secured to the flange 6 by the first and second lock mechanisms 5 and 5c.

Referring back to FIGS. 1 and 1A, the main control console 16 is positioned safely away from the nozzle 7 by approximately 15 to 20 feet and is attached to a cutting deck 21. The control console 16 independently operates the rotary actuator 10, the lift actuator 11, the retraction actuator 18 and the locking actuator 20 using a hydraulic power unit 14. Each actuator 10, 11, 18 and 20 is powered by hydraulic fluid that is pumped through hydraulic line 9 to each respective actuator. Alternatively, the lift actuator 11 may be replaced by a standard mechanical jack powered by either a hydraulic motor, an electric motor or a pneumatic motor (not shown). Similarly, the rotary actuator 10 may be replaced by standard reduction gear powered by either a hydraulic motor, an electric motor or a pneumatic motor(not shown). The retraction actuator 18 and the locking actuator 20 may include similar alternative methods of activation as described for the lift actuator 11. Any hydraulic fluid such as petroleum fluid, water glycol based hydraulic fluid or synthetic fluid may be used to power to the actuators 10, 11, 18 and 20. Referring to FIG. 1, the hydraulic fluid is maintained at a constant temperature of about 70° to 80° by a 110 volt AC heater 17a in the event that the deheader device 22 is used in lower ambient temperatures. Thus, the heater 17a allows the hydraulic fluid to remain at the required viscosity during the use of the deheader device 22.

In the event that the hydraulic power pack 14 is disabled, a manually operated standby pump (not shown) may be connected to the fluid supply line 15 to power each actuator 10, 11, 20 and 18. Likewise, if an actuator 10, 11, 18 or 20 is disabled, it may be easily removed from the deheader device 22 and quickly replaced with a manual means of actuation without undue loss of time or efficiency during the delayed coking process. For example, the lift actuator 11 may be removed from the deheader device 22 and replaced with a manually operated jack. Similarly, the coupling 44, which is shown in FIG. 4, may be unbolted and the rotary actuator 10 removed to manually rotate the bridge 1. If the retraction actuator 18 malfunctions, pin 54a, which is shown in FIG. 3, may be disconnected from the first link 53 enabling the cross shaft 53a to be manually rotated in order to open and close the first and second shell sections 4a and 4b. And, referring to FIG. 4, the locking actuator 20 may be disconnected from the lever 71 enabling the locking assembly to be manually operated.

Figure 5:
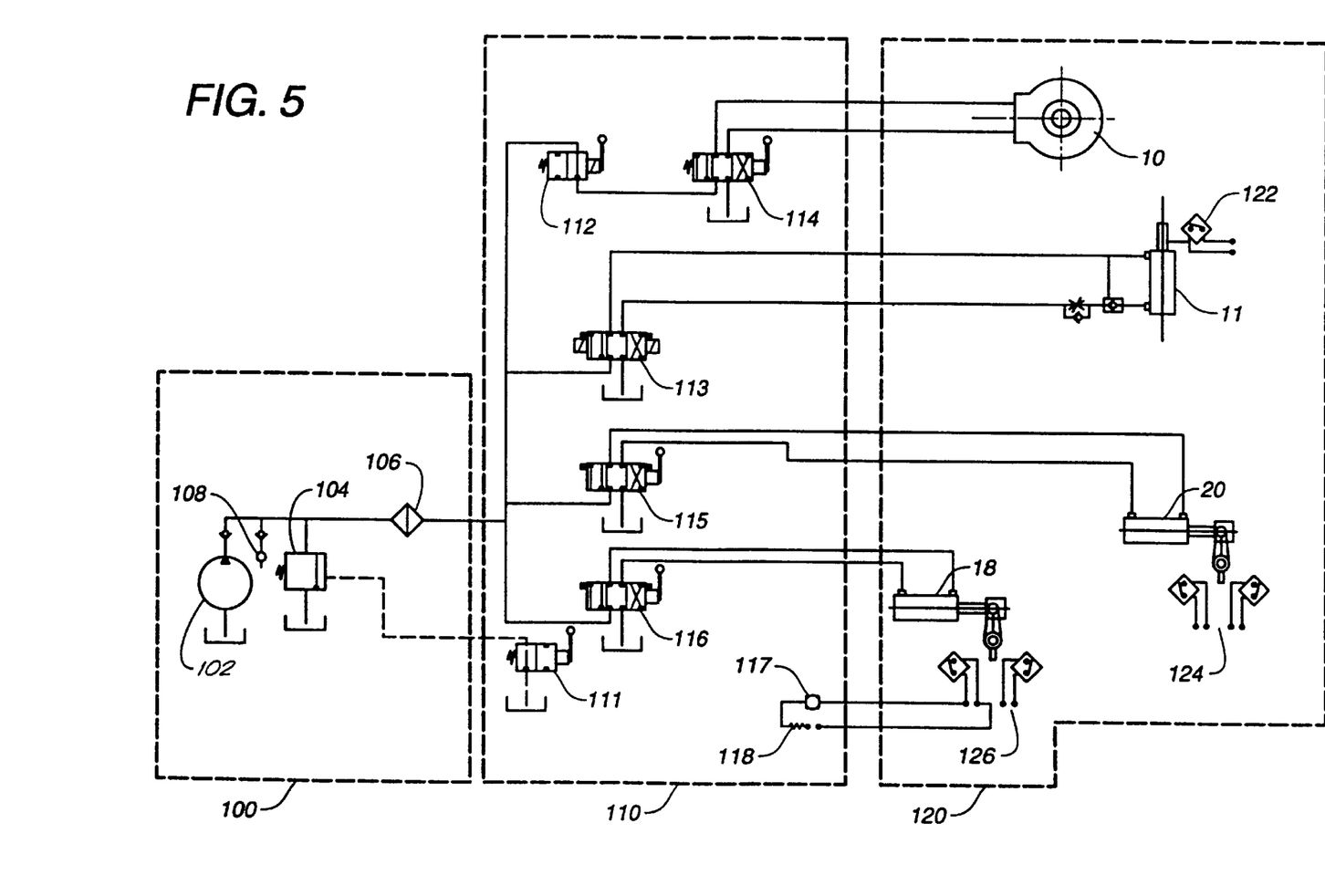
FIG. 5 is a schematic representation of the hydraulic components comprising the exchange assembly used in one embodiment of the present invention.

In FIG. 5, a schematic representation of the components comprising the power unit 100, the control console 110 and the exchange assembly 120 are illustrated in one embodiment of the present invention. The power unit 100 generally comprises a hydraulic pump 102 operated by an air or electric motor, a vented pressure relief valve 104 and a hydraulic filter 106. There is also a connection port 108 for a standby manually operated hydraulic pump in the event that electric power is lost.

The power unit 100 is connected to a control console 110 in order that the hydraulic fluid in hydraulic line 9 may be controlled. The control console 110 generally comprises a safety valve 111, a two way solenoid valve 112, a four way solenoid valve 113 and a three four way manually operated valves 114, 115, 116. The control console 110 is connected to the actuator assembly 120 and includes one or more indicator lamps 117 and relay coils 118.

The actuator assembly 120 generally comprises a rotary actuator 10, a lift actuator 11, a retraction actuator 18 and a locking actuator 20. Each actuator 11, 18 and 20 includes a respective proximity switch 122, 124 and 126, for control interlock and position indication.

The hydraulic pump 102 forces hydraulic fluid through the vented pressure relief valve 104 which is returned to a hydraulic reservoir if the pressure relief valve 104 is not overridden by the safety valve 111. The safety valve 111 is operated in conjunction with at least one of the four way valves 113, 114, 115 and 116. When the safety valve 111 is activated, it actuates the vented pressure relief valve 104 which pressurizes the common inlet line to the four way control valves 113, 114, 115 and 116. The vented pressure relief valve 104 will simultaneously maintain a consistent desired hydraulic pressure. When a respective four way control valve 113, 114, 115 and 116 is operated with the safety valve 111, it provides hydraulic pressure to the respective actuator 11, 18 and 20. The two way solenoid valve 112 functions as an interlock valve and will supply hydraulic fluid to the four way valve 114 and rotary actuator 10 only if the proximity switch 122 connected to the lift actuator 11 is closed and completes a circuit, activating the two way solenoid valve 112. If the safety valve 111 is released, then none of the hydraulic actuators 10, 11, 18 and 20 may be operated. Thus, the safety valve 111 operates as a "deadman's switch", requiring the operator to maintain physical control of the safety valve 111 at all times. A proximity switch 124, similar to that described in reference to FIG. 4A, is used to detect when the lock mechanisms 5 and 5c are in either the locked or unlocked position. Likewise, a proximity switch 126 is used to detect when the first and second shell sections 4a and 4b are in either the open or closed position. The foregoing components making up the power unit 100, the control console 110 and actuator assembly 120 may be simplified and made cost effective by use of hydraulic components such as hydraulic actuators and cylinders which may be tailored to the particular application.

With reference now to the drawings and foregoing description, the operation of the deheader device 22 will be explained. The deheader device 22 is not used until the coking process is complete and the coke drum is quenched to a low temperature and excess pressure inside the coke drum is reduced and the lock mechanisms 5 and 5c are in a locked positioned. The first vessel cover (blind flange) is manually unbolted from the upper flange 6 by removing the bolts with a pneumatic impact wrench. When residual pressure in the coke drum is reduced to a safe limit, the lock mechanisms 5 and 5c are released by activating the locking actuator 20 from the remote control console 16. The lift actuator 111 is then remotely actuated from the control console 16 thus, lifting the bridge 1 which, in turn, lifts the first vessel cover 2 above the upper flange 6. Once the first vessel cover 2 has adequately cleared the flange 6 as indicated by the control interlock safety system, the first vessel cover 2 is rotated out of the way by the rotary actuator 10 about a vertical axis of the deheader device 22 and replaced with the locking ring 3 and first and second shell sections 4a and 4b. Once the lock ring 3 is aligned over the upper flange 6, it is then lowered onto the flange 6 and secured thereto by the first and second lock mechanisms 5 and 5c.

The first and second shell sections 4a and 4b are then opened using the retraction actuator 18 for receipt of the pilot cutting head which is attached to the lower end of a drill stem and lowered into the coke drum. A safety control interlock ensures that the locking ring 3 is secured to the upper flange 6 and that the first and second shell sections 4a and 4b are open before the drill stem is lowered into the coke drum.

The first and second shell sections 4a and 4b are then remotely locked. A pilot hole is then drilled through the coke using high pressure water flowing through the pilot cutting head on the drill stem which cuts a tubular passage through the coke in the coke drum. The first and second shell sections 4a and 4b prevent any debris, water and steam from escaping during this process.

After the pilot hole is drilled, the pilot cutting head on the drill stem is replaced with a "final cutting" head. Alternatively, a final cutting head may be incorporated in the pilot cutting jets on the drill stem making the replacement of the pilot cutting head with a final cutting head unnecessary. During final cutting of the coke, large pieces of coke drop into a hopper for processing and shipping. After completion of the final coke cutting process, the first and second shell sections 4a and 4b are opened and the drill head and drill stem retracted from the coke drum by the derrick. Safety interlock position indicators prevent the drill head from being retracted if the first and second shell sections 4a and 4b are not first opened.

The first and second shell sections 4a and 4b are then closed and the locking ring 3 unlocked using the first and second lock mechanisms 5 and 5c. The bridge 1 is then raised and rotated 180° until the first vessel cover 2 is aligned above the flange 6 and lowered. Another safety control interlock ensures that the locking ring 3 is unlocked from the upper flange 6 before the locking ring 3 can be raised and rotated. The bridge 1 is then lowered and the first vessel cover 2 bolted back to the flange 6 using a pneumatic impact wrench. The same safety control interlock system ensures that the first vessel cover 2 is unlocked before the bridge can be raised and rotated.

Thus, a method and device for efficiently and safely replacing the coke drum blind flange with a retractable shell for use in a delayed coking process has been disclosed. While specific embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A remotely operated vessel cover exchange assembly used on a vessel, wherein the vessel includes an upper opening, a flange surrounding the upper opening and a first vessel cover releasably attached to the flange above the upper opening, the exchange assembly comprising:

a frame attached to the vessel adjacent the upper opening, the frame including a base with an opening there through;

a bridge for supporting the first vessel cover and a second vessel cover;

a central shaft positioned through the opening, the central shaft having a distal end connected to the bridge and a thrust collar surrounding the shaft below the distal end, the thrust collar having a thrust surface;

a lift assembly attached to the frame below the thrust collar for engaging the thrust surface and selectively raising and lowering the bridge relative to the flange; and a rotational assembly operatively connected to the central shaft for rotating the bridge to selectively align the first vessel cover or the second vessel cover above the flange.

2. The exchange assembly of claim 1, wherein the first vessel cover includes a blind flange releasably secured to the bridge by a first vessel cover bracket.

3. The exchange assembly of claim 1, wherein the second vessel cover includes a locking ring releasably secured to the bridge by a second vessel cover bracket and a retractable shell.

4. The exchange assembly of claim 3, wherein the retractable shell includes a first shell section, a second shell section and an opening formed there through, the first and second shell sections each being pivotally attached to the locking ring.

5. The exchange assembly of claim 4, further comprising a retraction assembly operatively connected to the first and second shell sections for selectively moving the first and second shell sections between an open and closed position, the retraction assembly including a retraction actuator having a first end connected to the locking ring and a second end pivotally connected to a first link, a first hinged arm having a first end connected to the first shell section and a second end pivotally connected to a second link, a second hinged arm having a first end connected to the second shell section and a second end pivotally connected to a third link, and a transverse shaft secured to the bridge, the first, second and third links being secured to the transverse shaft.

6. The exchange assembly of claim 1, further comprising a tubular support housing attached to the base through the opening for receipt of the central shaft, the central shaft being moveably supported within the support housing.

7. The exchange assembly of claim 1, wherein the central shaft includes a first shaft section and a second shaft section, the first shaft section having an outside diameter above a supporting surface of the thrust collar that is larger than an outside diameter of the second shaft section for stabilizing the bridge.

8. The exchange assembly of claim 1, wherein the lift assembly includes a lift actuator pivotally connected to the base, a lift frame surrounding the central shaft, the lift frame having a first end pivotally connected to the lift actuator, a second end pivotally connected to the base and a plurality of rotatable bearings positioned intermediate the first and second ends of the lift frame, wherein angular movement of the lift frame causes the rotatable bearings to engage the thrust surface resulting in axial movement of the bridge as the rotatable bearings traverse at least a portion of the thrust surface.

9. The exchange assembly of claim 8, wherein the plurality of rotatable bearings include a first wheel and a second wheel, the first wheel being positioned on the lift frame opposite the second wheel relative to the central shaft.

10. The exchange assembly of claim 1, wherein the rotational assembly includes a rotary actuator operatively secured to the base and a coupling, the coupling operatively connecting the rotary actuator and the central shaft for transmitting rotary movement from the rotary actuator to the central shaft, wherein the central shaft and the bridge are capable of both rotary and axial movement.

11. The exchange assembly of claim 10, wherein the rotary actuator is operatively secured to the base by a pair of brace members attached to the base and a securing plate attached to the rotary actuator, the securing plate having a pair of grooves for receipt of the respective pair of brace members, the rotary actuator being secured from rotation relative to the brace members and capable axial movement with the central shaft.

12. The exchange assembly of claim 1, further comprising a locking assembly for securing at least one of the first and second vessel covers to the flange, the locking assembly including a lock actuator secured to the frame, a first lock mechanism and a second lock mechanism, the first and second lock mechanisms being operatively connected to radially move between a locked position and an unlocked position when the lock actuator is activated.

13. The exchange assembly of claim 12, wherein the first lock mechanism is slidably positioned on a first lock support member attached to the vessel below the flange and the second lock mechanism is slidably positioned on a second lock support member attached to the vessel below the flange, the first and second lock mechanisms each having a recessed opening for receipt of a portion of at least one of the first and second vessel covers.

14. A method of replacing a first vessel cover used on a vessel that includes an upper opening and a flange surrounding the upper opening with a second vessel cover, comprising:

providing a bridge having a first end and a second end for supporting said first vessel cover at said first end and said second vessel cover at said second end;

lifting said bridge relative to said flange;

rotating said bridge to selectively align said first vessel cover or said second vessel cover above said flange; and wherein said vessel is a coke drum and said first vessel cover is replaced with said second vessel cover.

15. The method of claim 14, wherein said vessel is a coke drum and said vessel receives a drill, wherein said first vessel cover includes a blind flange and said second vessel cover includes a locking ring releasably secured to the bridge by a second vessel cover bracket and a retractable shell and wherein said first vessel cover is replaced with said second vessel cover before said drill is received by said vessel.

16. The method of claim 15, wherein said retractable shell is comprised of first and second shell sections and wherein said method further comprises opening said first and second shell sections before said vessel receives said drill.

17. The method of claim 15, further comprising:

manually releasing said first vessel cover before replacing it with said second vessel cover.

18. A method of making a remotely operated vessel cover exchange assembly used on a vessel that includes an upper opening, a flange surrounding the upper opening, and a first vessel cover releasably attached to the flange above the upper opening, the method comprising:

attaching a frame that includes a base with an opening therethrough to said vessel adjacent the upper opening;

providing a second vessel cover;

providing a bridge having a first end and a second end;

coupling said first end of said bridge to said first vessel cover;

coupling said second end of said bridge to said second vessel cover;

positioning a central shaft through said opening in said frame, said central shaft having a distal end;

coupling said distal end of said central shaft to said bridge;

coupling a thrust collar with said shaft so as to surround said shaft below said distal end, said thrust collar having a thrust surface;

coupling a lift assembly to said frame below said thrust collar for engaging the thrust surface and selectively raising and lowering said bridge relative to said flange; and coupling a rotational assembly to said central shaft for rotating said bridge to selectively align the first vessel cover or the second vessel cover above said flange.

* * * * *

UNITED STATES PATENT AND TRADEMARK OFFICE
CERTIFICATE OF CORRECTION

PATENT NO. : 6,228,225 B1
DATED : May 8, 2001
INVENTOR(S) : Feroze J. Meher-Homji It is certified that error appears in the above-identified patent and that said Letters Patent is hereby corrected as shown below:

Column 4,
Line 59, replace "I" with -- 1 --

Signed and Sealed this

Thirteenth Day of November, 2001

Attest:

NICHOLAS P. GODICI
Attesting Officer  Acting Director of the United States Patent and Trademark Office